(12) United States Patent
Rihtar (10) Patent No.: US 12,012,915 B2
(45) Date of Patent: Jun. 18, 2024

(54) PUMP COVER ATTACHMENT SYSTEM

(71) Applicant: Honda Motor Co., Ltd., Tokyo (JP)

(72) Inventor: Jonathan A. Rihtar, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 678 days.

(21) Appl. No.: 17/198,500

(22) Filed: Mar. 11, 2021

(65) Prior Publication Data

US 2022/0252029 A1    Aug. 11, 2022

Related U.S. Application Data (60) Provisional application No. 63/147,482, filed on Feb. 9, 2021.

(51) Int. Cl.
*F02M 37/10* (2006.01)
*B60K 15/03* (2006.01)

(52) U.S. Cl.
CPC ........... *F02M 37/103* (2013.01); *B60K 15/03* (2013.01); *B60K 2015/03467* (2013.01)

(58) Field of Classification Search
CPC .......... B60K 15/03; B60K 2015/03467; B60K 2015/03493; B60K 2015/03243; B60K 2015/03111; B60K 2015/03177; B29C 49/54; F02M 37/103
USPC ........................................................ 220/562
See application file for complete search history.

(56) References Cited

U.S. PATENT DOCUMENTS

| | | | |
|---|---|---|---|
| 4,545,588 A | 10/1985 | Nagai et al. | |
| 4,974,570 A * | 12/1990 | Szwargulski | B60K 15/06 123/514 |
| 5,044,526 A * | 9/1991 | Sasaki | F02M 37/103 222/377 |
| 5,409,091 A | 4/1995 | Reik et al. | |
| 5,415,146 A * | 5/1995 | Tuckey | F02M 37/106 137/113 |
| 5,647,329 A * | 7/1997 | Bucci | F02M 37/50 123/509 |
| 5,826,918 A * | 10/1998 | Bowles | F16L 37/0985 285/24 |
| 5,921,297 A | 7/1999 | Kremer et al. | |

(Continued)

FOREIGN PATENT DOCUMENTS

| | | |
|---|---|---|
| CN | 203335870 U | 12/2013 |
| CN | 204122846 U | 1/2015 |

(Continued)

*Primary Examiner* — Ernesto A Grano
(74) *Attorney, Agent, or Firm* — Gregory J Burke; American Honda Motor Co., Inc.

(57) ABSTRACT

A vehicle fuel pump assembly includes a fuel pump received in a tank opening, an annular pump mounting ring securing the pump to the tank at the opening, and a cover assembly including an annular cover ring and a cover. The cover ring is removably attached onto the underlying pump mounting ring and the cover is removably attached onto the cover ring to overly at least part of the fuel pump. The cover system can include a flexible attachment element on the cover ring engaging a peripheral notch in the pump mounting ring and clip elements securing the cover to the cover ring. The cover can include a hinge to provide pivoting of the cover or a portion of the cover with respect to the cover ring.

19 Claims, 6 Drawing Sheets

(56) References Cited

U.S. PATENT DOCUMENTS

| | | | |
|---|---|---|---|
| 5,931,353 A * | 8/1999 | Guyomard | B60K 15/077 417/423.15 |
| 6,283,731 B1 * | 9/2001 | Yoshioka | B01D 35/0273 137/574 |
| 6,435,365 B2 | 8/2002 | Pachciarz et al. | |
| 6,499,500 B2 * | 12/2002 | Rosseel | B29C 51/34 137/15.17 |
| 6,923,164 B1 * | 8/2005 | Mitsudou | F02M 37/103 123/514 |
| 7,201,151 B2 * | 4/2007 | Hayakawa | F04D 13/0666 123/509 |
| 7,303,553 B2 | 12/2007 | Ott | |
| 7,341,047 B2 | 3/2008 | Sone et al. | |
| 7,886,721 B2 * | 2/2011 | Sanden | B60K 15/077 123/509 |
| 7,992,546 B2 * | 8/2011 | Eck | B60K 15/077 123/509 |
| 8,033,415 B2 | 10/2011 | Shimoda et al. | |
| 8,240,332 B1 * | 8/2012 | Matusek | F02M 37/106 137/565.17 |
| 8,292,367 B2 | 10/2012 | Park | |
| 8,714,940 B2 | 5/2014 | Nomura et al. | |
| 9,061,580 B2 * | 6/2015 | Gardien | B60K 15/03519 |
| 9,080,537 B2 | 7/2015 | Choi et al. | |
| 10,125,854 B2 | 11/2018 | Lingren et al. | |
| 10,145,341 B2 * | 12/2018 | Kim | F02M 37/14 |
| 10,451,058 B2 | 10/2019 | Popelka et al. | |
| 2003/0141304 A1 * | 7/2003 | Franjo | B62D 33/00 220/562 |
| 2005/0194796 A1 * | 9/2005 | Powell | F02M 37/103 220/298 |
| 2006/0113309 A1 | 6/2006 | Zdroik et al. | |
| 2007/0039963 A1 | 2/2007 | Krentz et al. | |
| 2011/0101006 A1 * | 5/2011 | Gardien | B60K 15/03177 220/669 |
| 2012/0187131 A1 | 7/2012 | Claucherty | |
| 2016/0097457 A1 | 4/2016 | Sun et al. | |
| 2016/0152379 A1 | 6/2016 | Leonard et al. | |
| 2017/0326975 A1 | 11/2017 | Leonard | |
| 2019/0120312 A1 | 4/2019 | White et al. | |
| 2019/0234357 A1 | 8/2019 | Aponte Hernandez et al. | |
| 2019/0285031 A1 | 9/2019 | Fellague et al. | |
| 2020/0056614 A1 | 2/2020 | Blad | |

FOREIGN PATENT DOCUMENTS

| | | |
|---|---|---|
| CN | 207916562 U | 9/2018 |
| CN | 209510653 U | 10/2019 |
| CN | 211370816 U | 8/2020 |
| CN | 111828371 A | 10/2020 |
| KR | 100930661 B1 | 12/2009 |
| KR | 101746438 B1 | 6/2017 |
| KR | 20180031236 A | 3/2018 |
| WO | WO2018166975 A1 | 9/2018 |

* cited by examiner

PUMP COVER ATTACHMENT SYSTEM

The present application claims priority to U.S. Provisional Patent Application Ser. No. 63/147,482 filed Feb. 9, 2021, which is incorporated herein.

BACKGROUND

The present disclosure relates to vehicle fuel pumps. Fuel pumps are often mounted to vehicle tanks in locations and configurations potentially exposing the pump to harmful environmental factors such as water, road salt, and stones. Protective coverings for protecting vehicle fuel pumps, however, add complexity to the installation process, thereby increasing manufacturing time and costs. In addition, the presence of the protective cover can also inhibit subsequent access to the underlying pump components such that repair/replacement of pump-related components is impeded. As such, vehicle fuel pumps typically do not include protective coverings. Without protection, fuel pumps can be exposed to potential damage.

What is needed is a cover system for protecting a vehicle fuel pump mounted to a vehicle fuel tank. More particularly, what is needed is a cover attachment system that provides a secure connection of a protective cover to an underlying vehicle fuel pump while also providing for rapid installation and removal facilitating manufacturing and repair/replacement factors.

BRIEF DESCRIPTION

According to one aspect, a vehicle fuel pump assembly includes a fuel pump received in a pump opening defined by a vehicle fuel tank, an annular pump mounting ring securing the pump to the fuel tank at the pump opening, and a cover assembly having an annular cover ring and a cover. The cover ring is removably attached onto the pump mounting ring and the cover is removably attached onto the cover ring such that the cover overlies at least a portion of the fuel pump.

According to embodiments, the cover of the cover assembly can include a pair of attachment elements engaging a notch formed in an outer peripheral edge of the pump mounting ring. The cover assembly can include a clip attached by a tether to the cover ring to engage aligned openings in the cover and the cover ring. The cover of the cover assembly can include a hinge joint for pivot between first and second parts of the cover.

According to another aspect, a cover assembly for a vehicle fuel pump assembly includes an annular cover ring and a cover. The cover ring includes at least one attachment element removably attaching the cover ring to a pump mounting ring of the pump assembly such that the cover ring overlies the pump mounting ring. The cover is removably attached onto the cover ring such that the cover overlies at least a portion of a fuel pump of the pump assembly.

DETAILED DESCRIPTION

Figure 1A:
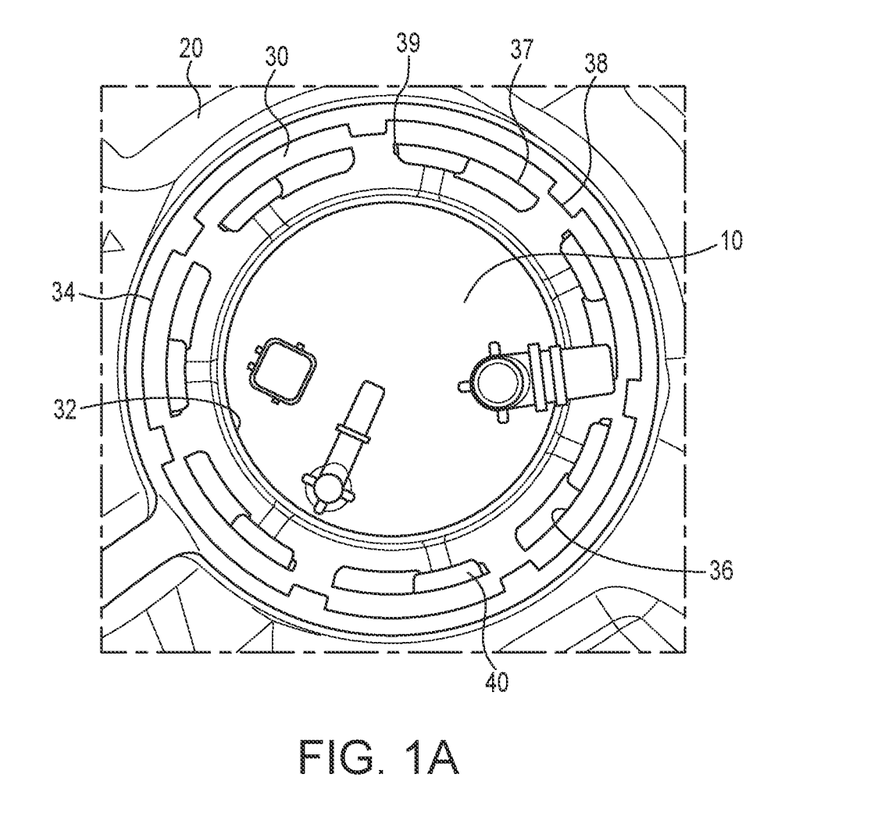
FIGS. 1A and 1B are views showing a fuel pump secured in a tank opening at a mounting location by a pump mounting ring.
Figure 1B:
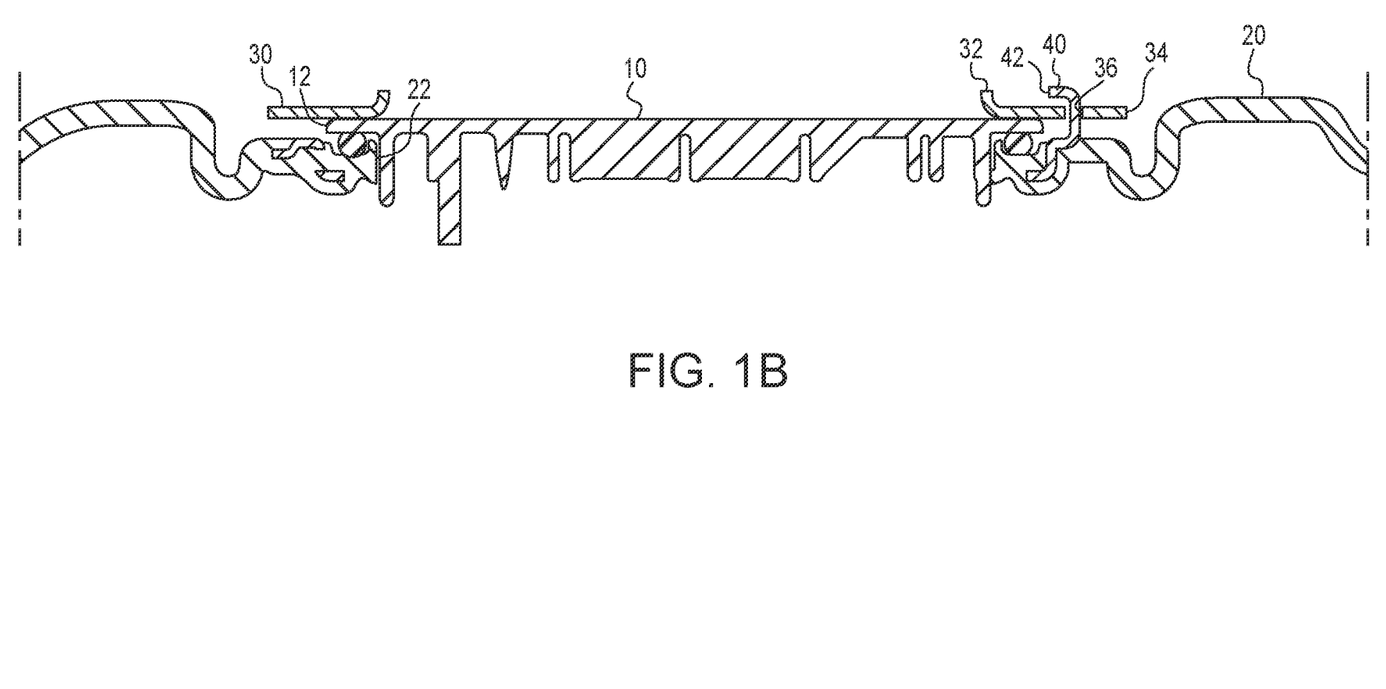

It should be understood that the description and drawings herein are merely illustrative and that various modifications and changes can be made without departing from the present disclosure. Referring now to the drawings, wherein like numerals refer to like parts throughout the several views, FIGS. 1A and 1B show a fuel pump 10 mounted to a vehicle fuel tank 20 and secured by a pump mounting ring 30. The fuel pump 10, which is received in an opening 22 of the fuel tank 20, includes a peripheral lip or flange 12 arranged to extend over a portion of the tank adjacent the opening.

The pump mounting ring 30 is an annular disc with an inner peripheral edge 32 defining a central aperture and an outer peripheral edge 34. The mounting ring 30 also includes a plurality of circumferentially-extending retaining slots 36 and notches 38 each defined in the outer peripheral edge 34 between respective pairs of the retaining slots 36. The depicted pump mounting ring 30 includes seven slots 36 and seven peripheral notches 38.

As shown in FIG. 1B, the pump mounting ring 30 is dimensioned for receipt over the pump flange 12 to sandwich the pump flange 12 between the mounting ring and the tank 20. A plurality of cam locks 40 are connected to the fuel tank 20 (e.g., over-molded by the fuel tank as depicted) adjacent the opening 22. Each of the cam locks defines an inwardly-turned lip 42 at an upper end of the cam lock. The cam locks 40 are arranged to extend upwardly through the retaining slots 36 of the pump mounting ring 30.

As shown in FIG. 1A, each of the retaining slots 36 includes a relatively wide slot portion 37 leading to a relatively narrow slot portion 39. The wide slot portions 37 are dimensioned to allow passage of the lip 42 through the mounting ring 30 while the narrow slot portions 39 are not. Arranged in this manner, placement of the pump mounting ring 30 onto the tank 20 over the pump 10 followed by relative rotation of the mounting ring (i.e., to advance the cam locks into the narrow slot portions 39) serves to secure the fuel pump 10 in a retained condition in the tank opening 22.

Figure 2A:
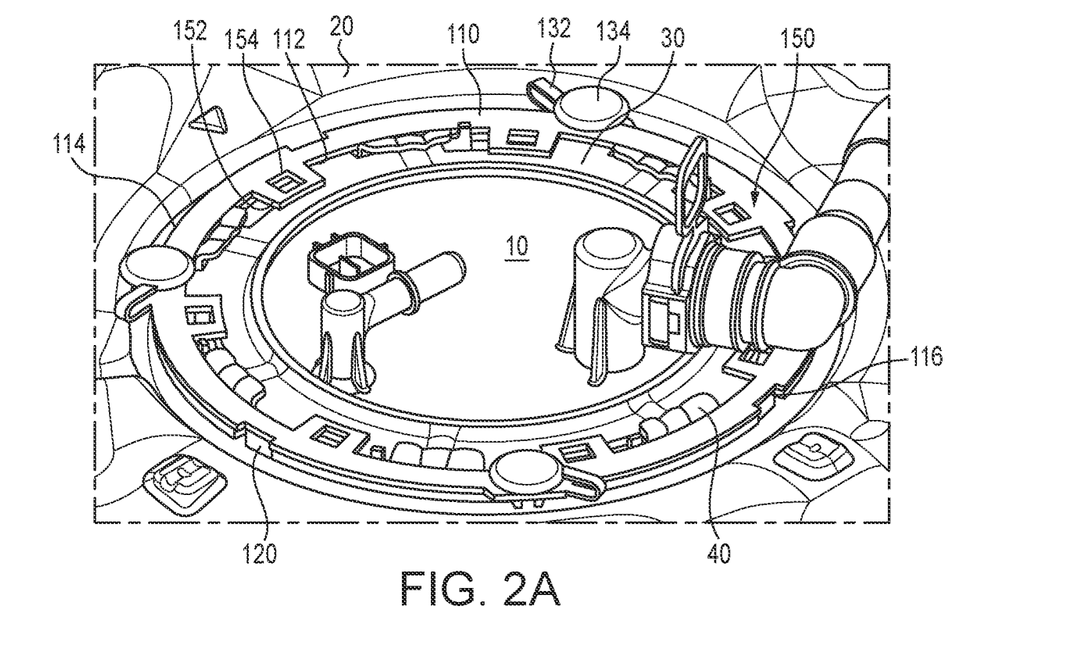
FIGS. 2A-2C are views of a fuel pump cover attachment system including a ring and clip arrangement for attaching a cover to the pump mounting ring of FIGS. 1A and 1B according to one embodiment.
Figure 2B:
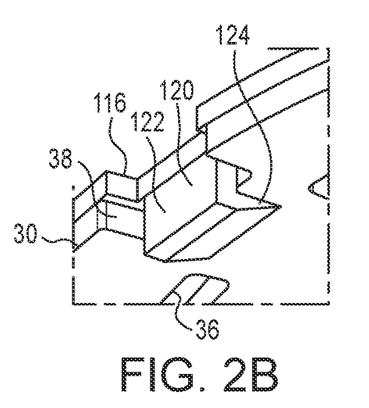
Figure 2C:
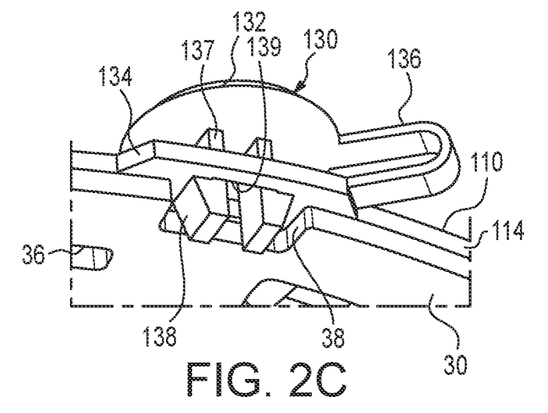
Figure 2D:
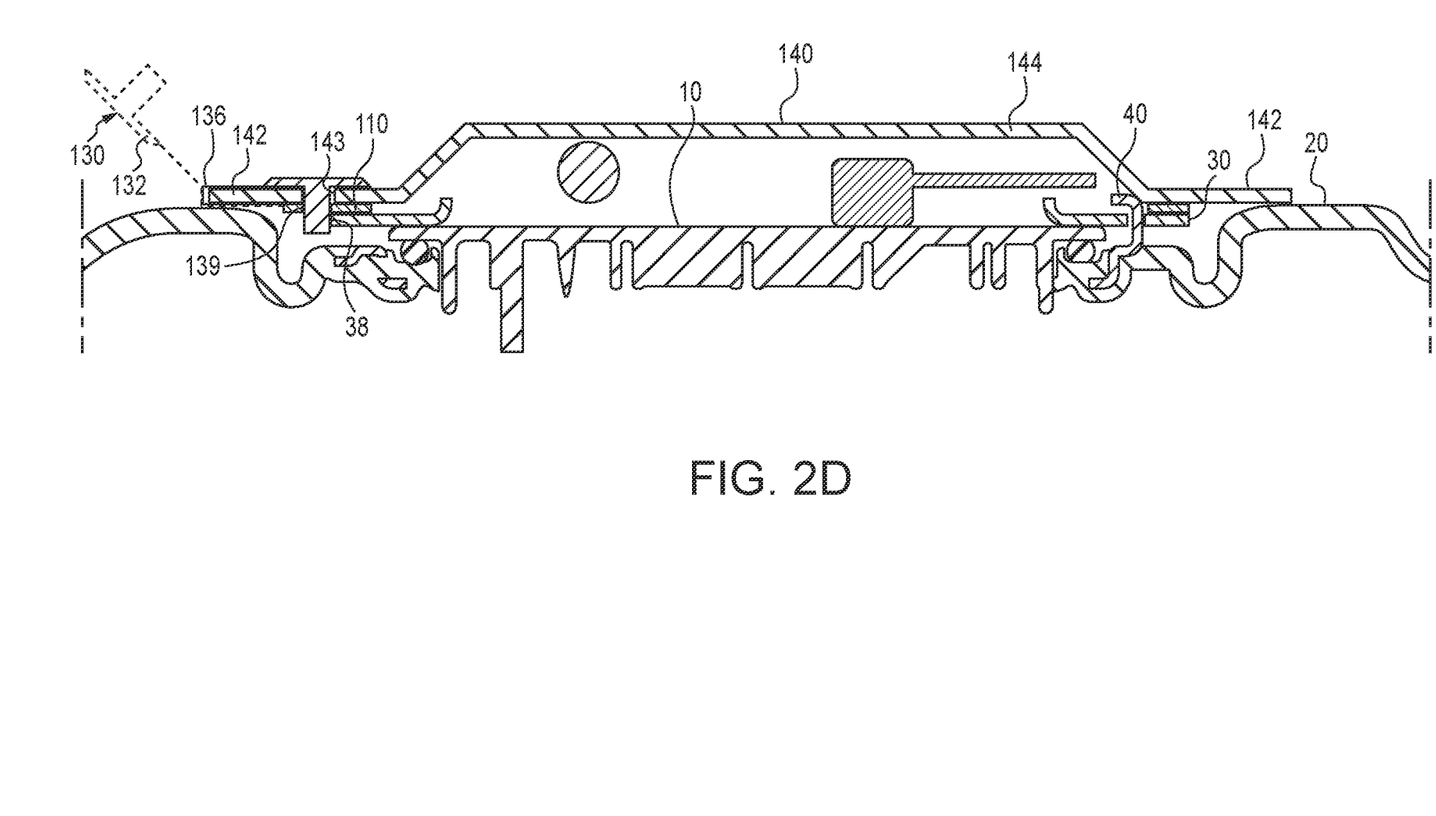
FIG. 2D is a view of the pump cover attachment system of FIGS. 2A-2C shown with a first embodiment of cover attached.

Referring to FIGS. 2A-2D, there is shown a pump cover system 100 for protecting the above-described fuel pump 10 that is secured by a pump mounting ring 30 in a pump opening defined by a vehicle fuel tank 20. As shown in FIG. 2D, the cover system 100 includes a protective pump cover 140 configured and arranged to extend over the underlying tank-mounted pump 10. The cover system 100 has been illustrated in FIGS. 2A-2C with the pump cover 140 removed for clarity of view of other elements of the cover system. The cover system 100 includes an annular ring 110 having an inner peripheral edge 112 defining a central aperture and an outer peripheral edge 114. Ring 110 may also be referred to as the "cover attachment ring" or the "cover ring" to distinguish it from the pump mounting ring 30 (or the "pump ring") to which it is attached.

As shown, the outer peripheral edge 114 of cover ring 110 is dimensioned (i.e., has a diameter) to substantially match the outer peripheral edge 34 of the underlying pump ring 30. However, the inner peripheral edge 112 of cover ring 110 has a larger diameter than the inner peripheral edge 32 of pump ring 30 such that the cover ring 110 is narrower than the pump ring. In the depicted system 100, the cover ring 110 has a radial extent (width) that is less than approximately ⅓ of that of the adjacent pump ring 30 (see FIG. 2A).

The cover ring 110 includes snap-fit pump connectors 120 for attaching the cover ring onto the adjacent underlying pump mounting ring 30. The pump connectors 120 may also be referred to as an "attachment members" or a "flexible" members. The depicted cover ring 110 includes four pump connectors 120 at spaced locations about the cover ring. The spacing of the pump connectors 120 on the cover ring 110 is arranged to provide for the adjacent positioning between each connector 120 and one of the peripheral notches 38 on the underlying pump mounting ring 30. Each pump connector 120 is located within a notch 116 defined in the outer peripheral edge 114 of the cover ring 110.

As shown, the pump connector 120 is located on an interior edge of the pump connector notch 116 to facilitate snap-fit attachment with a corresponding interior edge of the associated pump ring notch 38. Each of the pump connectors 120 includes an elongated arm portion 122 extending downwardly from cover ring notch 116 and an inwardly-directed hook portion 124 configured and arranged for engagement with a lower surface of the pump mounting ring 30 adjacent the interior edge of the pump ring notch 38. As shown, the hook portion 124 includes a tapered lower surface to facilitate an outward deflection of the flexible pump connector, as might be caused for example by contact between the connector 120 and the pump ring notch 38 during installation for example.

The cover system 100 includes cover clips 130 (or "cover attachment clips") for securing a cover 140 to the underlying cover ring 110. The cover clips 130 are attached to the cover ring 110 by elongated tethers 136. Each cover clip 130 includes a disk-shaped base 132 and a pair of elongated attachment elements 137 extending downwardly from a lower surface of the base. Each of the attachment elements 137 of the pair includes an outwardly-extending hook element 138 at a distal end of the attachment element for snap-fit engagement with an edge of an opening 139 defined by the cover ring 110.

As shown, the openings 139 for the clips 130 are at least partly defined in projections 134 (or "tabs") extending outwardly from the outer peripheral edge 114 of the cover ring 110. The tether 136 interconnects the base 132 of the clip 130 to the associated cover ring projection 134 to position the clip 130 for engagement with the opening 139 defined by the projection. As shown in FIG. 2C, the attachment elements 137 extend through the projection opening 139 into the space defined by the underlying pump ring notch 38.

As can be seen in FIG. 2D, the attachment elements 137 of clip 130 are received through an opening 143 defined in an outer peripheral flange portion 142 of cover 140 as well as the aligned opening 139 in the cover ring 110 to secure the cover 140 onto the cover ring 110. The hook portion 138 of the attachment element 137 includes a tapering surface to facilitate deflection of the attachment element (e.g., during installation contact between the attachment element 137 and the cover ring opening 139).

The tether 136 of clip 130 is substantially U-shaped to facilitate return of the tether from the ring projection 134 about the outer cover flange 142 for engagement of the attachment elements 137 through the respective openings 143, 139 of the cover 140 and the ring projection 134. The cover 140 can include a raised interior portion 144 connected to the peripheral flange 142 (e.g., providing clearance for pump-related components). The attachment features of the pump cover system provides for a secure attachment of the cover at the pump installation while also providing for rapid installation and removal facilitating manufacturing and repair/removal efforts.

As shown in FIG. 2A, the pump cover system 100 can also include auxiliary attachment locations 150 spaced about the cover ring 110 for attaching other components (e.g., harnesses) to the cover ring. Each attachment location 150 includes a tab 152 projecting inwardly from an inner periphery of the cover ring 110 and defining an aperture 154.

Figure 2E:
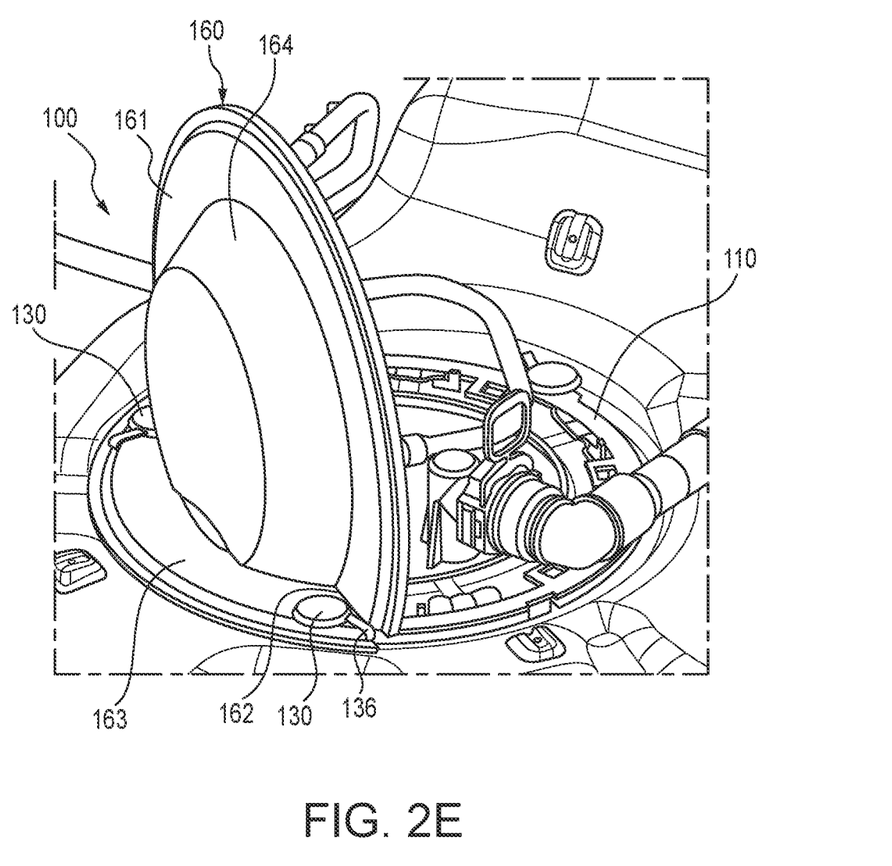
FIG. 2E is a view of the pump cover attachment system of FIGS. 2A-2C shown with a second embodiment of cover attached.
Figure 2F:
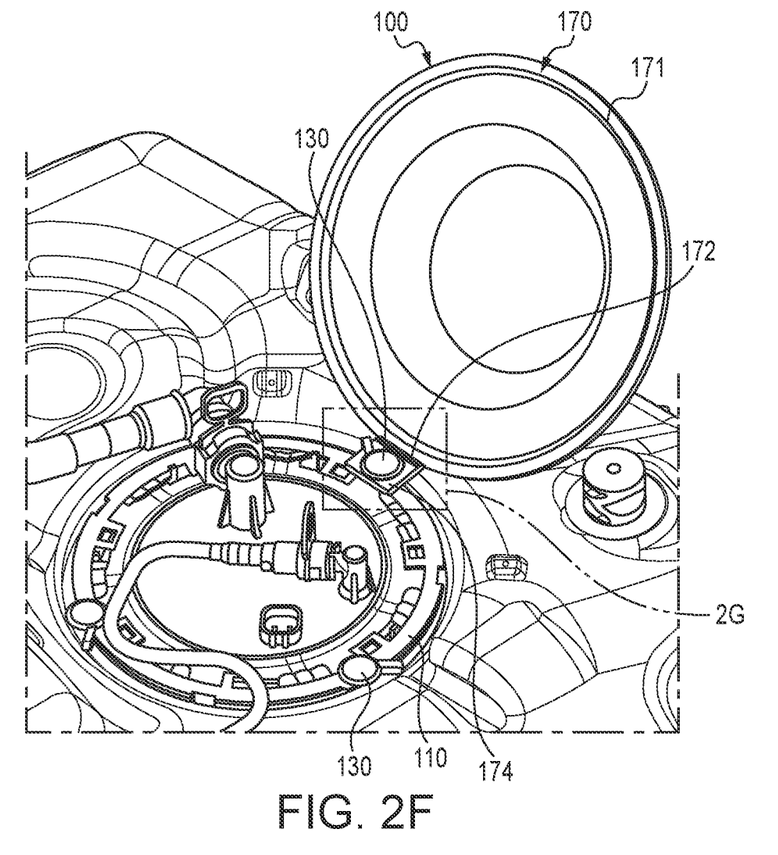
FIGS. 2F and 2G are views of the pump cover attachment system of FIGS. 2A-2C shown with a third embodiment of cover attached, FIG. 2G being an enlarged view of a portion of FIG. 2F.
Figure 2G:
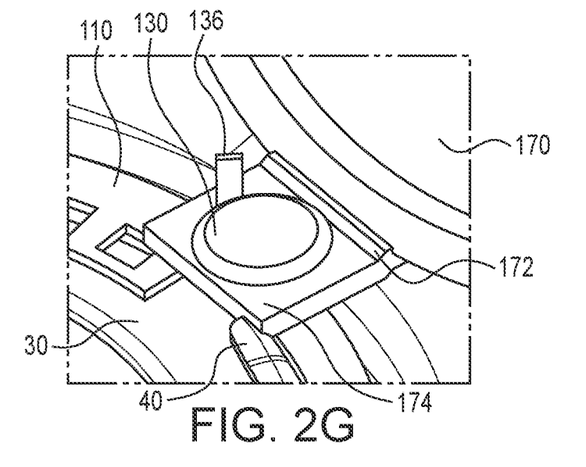

Referring to FIGS. 2E-2G, the cover ring 110 and clips 130 discussed above for FIGS. 2A-2D could be used with differently embodied covers in the place of cover 140. In FIG. 2E, a protective cover 160 includes a hinge 162 to facilitate access to the pump 10 and pump-related components without requiring the complete removal of the cover. The hinge 162 extends across an intermediate portion of the cover 160 to define first and second parts 163, 164 of the cover. As shown in FIG. 2E, the hinge 162 is arranged such that the first cover part 163 can remain attached to the cover ring 110 by two of the clips 130 when the second cover part 164 can be separately pivoted to an open position.

As shown, a third one of the clips 130 provided with the cover ring 110 could be clipped directly to the associated opening 139 of cover ring 110 such that the clip is positioned under the second cover part 164 in the closed cover condition. Arranging the cover 160 in this manner would facilitate ready pivoting of the second cover part 164 for access to underlying components (e.g., for repair/replacement). As should be understood, however, the protective cover 160 could alternatively be configured to include an opening (not shown) in the second cover part 164 for securing the second cover part to the cover ring 110 using the third clip 130.

Referring to FIGS. 2F and 2G, a second alternative cover 170 is shown for use with the cover ring 110 and clips 130 of FIGS. 2A-2D. Like cover 160, the cover 170 also includes a hinge 172 allowing access to the pump and pump-related components without requiring complete removal of the cover. The cover 170 includes a mounting tab 174 connected to an outer flange 171 of the cover by the hinge 172. As shown, the mounting tab 174 is configured for receipt of one of the clips 130 to secure the mounting tab to the cover ring 110. In this manner, the tab 174 remains attached to the cover ring while the rest of the cover 170 is pivoted to an open position as shown in FIG. 2F.

In a similar manner as protective cover 160, the protective cover could be configured such that the second and third clips 130 are clipped directly to the associated openings 139 such that the clips 130 are located underneath the cover flange in the closed-cover condition. As should be understood, however, the cover 170 could alternatively be configured to include openings (not shown) for engagement by the clips 130 to secure the cover to the cover ring 110 in the closed cover condition.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle fuel pump assembly comprising:
   a fuel pump received in a pump opening defined by a vehicle fuel tank;
   an annular pump mounting ring securing the pump to the fuel tank at the pump opening; and
   a cover assembly including an annular cover ring, a cover, and at least one cover clip, the cover ring removably attached onto the pump mounting ring, and the cover clip engaging both the cover and the cover ring to removably attach the cover onto the cover ring such that the cover overlies at least a portion of the fuel pump.

2. The fuel pump assembly of claim 1, wherein the cover ring of the cover assembly includes at least one flexible attachment element engaging the pump mounting ring.

3. The fuel pump assembly of claim 2, wherein the pump mounting ring includes a peripheral notch defined along an outer peripheral edge, the attachment element of the cover ring engaging the peripheral notch of the pump mounting ring.

4. The fuel pump assembly of claim 3, wherein the attachment element includes an elongated arm portion extending downwardly from the cover ring and a hook portion projecting inwardly from the arm portion to provide snap attachment with an interior edge of the notch in the pump mounting ring.

5. The fuel pump assembly of claim 3, wherein the cover ring includes a notch at an outer periphery of the cover ring configured to overly the notch in the pump mounting ring, the attachment element located at an edge of the cover ring notch for attachment to a corresponding edge of the pump mounting ring notch.

6. The fuel pump assembly of claim 1, wherein the cover clip of the cover assembly includes a disk-shaped base and a pair of flexible cover attachment elements extending from the base and received in aligned openings in the cover and the cover ring.

7. The fuel pump assembly of claim 6, wherein the opening in the cover ring for the cover clip is at least partially defined by a tab portion extending outwardly from an outer peripheral edge of the clip ring.

8. The fuel pump assembly of claim 7, wherein the cover clip of the cover assembly further includes a tether interconnecting the base of the cover clip to the cover ring adjacent the cover ring opening for the associated cover clip.

9. The fuel pump assembly of claim 6, wherein each of the pair of cover attachment elements of the cover clip includes an elongated arm portion extending downwardly from a lower surface of the base and an outwardly projecting hook portion.

10. The fuel pump assembly of claim 1, wherein the cover ring has an outer diameter substantially matching an outer diameter of the pump mounting ring in at least one portion of the cover ring.

11. The fuel pump assembly of claim 10, wherein the cover ring has an inner diameter substantially greater than an inner diameter of the pump mounting ring in at least one portion of the cover ring such that the cover ring has a radial extent substantially less than a radial extent of the pump mounting ring.

12. The fuel pump assembly of claim 11, wherein the cover ring radial extent is less than approximately ⅓ of the pump mounting ring radial extent.

13. The fuel pump assembly of claim 1, wherein the pump mounting ring includes elongated slot openings, the pump mounting ring secured to the fuel tank by cam members extending upwardly from the fuel tank and received in the pump mounting ring slots.

14. The fuel pump assembly of claim 1, wherein the cover of the cover assembly includes a hinge joint allowing pivoting between first and second parts of the cover.

15. The fuel pump assembly of claim 14, wherein the cover includes a peripheral flange portion and a raised interior portion, the hinge joint extending through the flange and the raised interior portion of the cover.

16. The fuel pump assembly of claim 14, wherein the cover includes a peripheral flange portion and a tab portion extending from the peripheral flange portion, the hinge joint defined between the cover flange and the cover tab, cover tab portion attached to the cover ring.

17. A vehicle fuel pump assembly comprising:
   a pump received in a pump opening defined by a fuel tank;
   an annular pump mounting ring securing the pump to the tank at the pump opening, the pump mounting ring including at least one elongated slot opening receiving a projection of the fuel tank for securing the pump mounting ring to the fuel tank; and
   a cover assembly including an annular cover ring overlying the pump mounting ring and a cover overlying the cover ring, the cover including a hinge providing pivot between first and second parts of the cover, the cover ring removably attached onto the pump mounting ring by at least one cover ring attachment member engaging the pump mounting ring adjacent a peripheral notch defined by the pump mounting ring.

18. A protective cover system for a vehicle fuel pump assembly including a fuel pump mounted at an opening defined by an upper surface of a fuel tank by an annular pump mounting ring, the mounting of the fuel pump exposing the fuel pump to an exterior of the fuel tank at the opening, the protective cover system including:
   an annular cover ring including at least one attachment element removably attaching the cover ring to the pump mounting ring such that the annular cover ring overlies the pump mounting ring; and
   a cover overlying the fuel pump to protect the fuel pump from exposure to the exterior of the tank at the opening; and
   at least one cover attachment member removably attaching the cover to the cover ring such that the cover alternatively provides protection of the fuel pump against exposure to the exterior of the fuel tank at the opening when the cover is attached to the cover ring and provides access to the fuel pump from the exterior of the fuel tank through the opening when the cover is not attached.

19. The protective cover system of claim 18, wherein the cover attachment member is a clip engaging the cover ring to attach the cover to the cover ring.

* * * * *